(12) United States Patent
Subramanian

(10) Patent No.: US 12,254,471 B1
(45) Date of Patent: Mar. 18, 2025

(54) METHOD FOR ENCRYPTING NFT'S USING DYNAMIC KEY EXCHANGE ON THE BLOCKCHAIN

(71) Applicant: Hemang Subramanian, Miami, FL (US)

(72) Inventor: Hemang Subramanian, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/789,222

(22) Filed: Jul. 30, 2024

Related U.S. Application Data

(60) Provisional application No. 63/582,700, filed on Sep. 14, 2023.

(51) Int. Cl.
| | |
|---|---|
| G06Q 20/00 | (2012.01) |
| G06F 21/62 | (2013.01) |
| G06Q 20/38 | (2012.01) |
| G06Q 20/40 | (2012.01) |
| H04L 9/08 | (2006.01) |

(52) U.S. Cl.
CPC ....... *G06Q 20/389* (2013.01); *G06F 21/6245* (2013.01); *G06Q 20/3825* (2013.01); *G06Q 20/401* (2013.01); *H04L 9/0891* (2013.01)

(58) Field of Classification Search
CPC ............. G06Q 20/389; G06Q 20/3825; G06Q 20/401; G06F 21/6245; H04L 9/0891
USPC .................. 705/16, 21, 59; 380/262, 278
See application file for complete search history.

(56) References Cited

U.S. PATENT DOCUMENTS

2023/0325814 A1* 10/2023 Vijayan .............. G06Q 20/3829
705/66

OTHER PUBLICATIONS

Battah, Ammar et al. "Blockchain-Based Multi-Party Authorization for Accessing IPFS Encrypted Data." IEEE Access, vol. 8, pp. 196813-196825, (Year: 2020).
Lin, Yufei & Zhang, Chongyang et al. "A Method for Protecting Private Data in IPFS." Proceedings of the 2021 IEEE 24th International Conference on Computer Supported Cooperative Work in Design (CSCWD), pp. 404-409, (Year: 2021).
Subramanian, Hemang & Subramanian, Susmitha "Improving Diagnosis Through Digital Pathology: Proof-of-Concept Implementation Using Smart Contracts and Decentralized File Storage." Journal of Medical Internet Research, 24(3):1-26, Mar. 28, 2022.

* cited by examiner

*Primary Examiner* — Dante Ravetti
(74) *Attorney, Agent, or Firm* — SALIWANCHIK, LLOYD & EISENSCHENK

(57) ABSTRACT

Systems and methods for providing a decentralized marketplace for patient-generated health data are provided. The systems and methods can store medical records on an interplanetary file system (IPFS) and blockchain, with the ability to encrypt and decrypt data on the IPFS and blockchain. This can securely associate and/or dissociate users from their "owned" property, securely transfer the ownership of records, securely share the records to other users, facilitate payment for nonfungible token (NFT) records, and/or facilitate transfers to aggregators of health records.

20 Claims, 9 Drawing Sheets

METHOD FOR ENCRYPTING NFT'S USING DYNAMIC KEY EXCHANGE ON THE BLOCKCHAIN

CROSS-REFERENCE TO RELATED APPLICATION

This application claims the benefit of U.S. Provisional Application Ser. No. 63/582,700, filed Sep. 14, 2023, the disclosure of which is hereby incorporated by reference in its entirety, including all figures, tables, and drawings.

BACKGROUND

Wearable devices have limited ability to store and process patient-generated health data. Currently, individual users or data aggregators are unable to monetize or contribute such data to wider analytics use cases. When combined with clinical health data, such data can improve the predictive power of data-driven analytics and can proffer many benefits to improve the quality of care.

BRIEF SUMMARY

Embodiments of the subject invention provide a marketplace mechanism to make patient-generated health data available while benefiting data providers. Embodiments of the subject invention provide novel and advantageous systems and methods for providing a decentralized marketplace for patient-generated health data that can improve provenance, data accuracy, security, and privacy. The systems and methods can store medical records on an interplanetary file system (IPFS) and/or blockchain, with the ability to encrypt and decrypt data on the IPFS and blockchain. This can securely associate and/or dissociate users from their "owned" property, securely transfer the ownership of records, securely share the records to other users, facilitate payment for nonfungible token (NFT) records, and/or facilitate transfers to aggregators of health records. The provenance of the health record on such a system can be automatically managed by the NFT record.

A unique encryption algorithm for data transfer (e.g., internet protocol (IP) transfer) can be used to ensure secure data storage, privacy, and accurate change of ownership of the underlying data record, which is stored on an IPFS and whose ownership is recorded by the NFT. An NFT technology can be combined with data storage (e.g., public data storage) in an IPFS to accomplish the secure storage, ownership, and transfer of health data. This encryption algorithm and the underlying IPFS technology can drastically reduce costs for healthcare organizations overall. Additionally, only the patient who owns the data will be able to access the data. Further, the algorithm allows the patient and others to grant access to other third parties (e.g., hospitals, doctors, etc.) while monitoring the exact source of such data.

In an embodiment, a system for providing a decentralized marketplace for patient-generated health data can comprise: a processor; and a machine-readable medium in operable communication with the processor and having instructions stored thereon that, when executed by the processor, perform the following steps: encrypting the patient-generated health data using a symmetric key to generate encrypted health data; sending the encrypted health data to an IPFS with the symmetric key and storing the encrypted health data and the symmetric key on the IPFS; generating encrypt data with a shared key and providing it to an owner of the patient-generated health data; creating an NFT and listing the NFT for sale on a data marketplace; facilitating a purchase of the NFT by a purchaser from the data marketplace; notifying the owner of the purchase; generating a re-encryption key from the shared key; re-encrypting the patient-generated health data (e.g., after decrypting the encrypted health data using the symmetric key) using the re-encryption key to generate re-encrypted health data; providing the symmetric key and the re-encrypted health data to the purchaser; and decrypting the re-encrypted health data using the symmetric key to generate decrypted health data (which can then be used by the purchaser). The NFT can be created using a blockchain (e.g., an Ethereum blockchain) using smart contracts. The NFT itself can be a smart contract, for example following ERC 732 (Ethereum Request for Comments 732). The instructions when executed can further perform the following steps: after decrypting the re-encrypted health data, encrypting the decrypted health data with the symmetric key to generate post-use encrypted health data; and/or sending the post-use encrypted health data to the IPFS with the symmetric key and storing the post-use encrypted health data and the symmetric key on the IPFS. The re-encrypting of the patient-generated health data can be performed using a re-encryption oracle, which can be defined as a system that generates random re-encryption keys and distributes it/them to the corresponding users in a specified format. The instructions when executed can further perform the following step: before re-encrypting the patient-generated health data, sending the encrypted health data and the symmetric key from the IPFS to the re-encryption oracle (the re-encryption oracle may then use the symmetric key to decrypt the encrypted health data back to the patient-generated health data before re-encrypting patient-generated health data). The generating of the encrypt data with the shared key can be performed using a multi-party authentication server. The generating of the re-encryption key can be performed using the multi-party authentication server. The instructions when executed can further perform the following steps: before generating the re-encryption key, sending the shared key to the multi-party authentication server; and/or before re-encrypting the patient-generated health data, sending the re-encryption key to the re-encryption oracle from the multi-party authentication server.

In another embodiment, a method for providing a decentralized marketplace for patient-generated health data can comprise: encrypting (e.g., by a processor) the patient-generated health data using a symmetric key to generate encrypted health data; sending (e.g., by the processor) the encrypted health data to an IPFS with the symmetric key and storing the encrypted health data and the symmetric key on the IPFS; generating (e.g., by the processor) encrypt data with a shared key and providing it to an owner of the patient-generated health data; creating (e.g., by the processor) an NFT and listing the NFT for sale on a data marketplace; facilitating (e.g., by the processor) a purchase of the NFT by a purchaser from the data marketplace; notifying (e.g., by the processor) the owner of the purchase; generating (e.g., by the processor) a re-encryption key from the shared key; re-encrypting (e.g., by the processor) the patient-generated health data (e.g., after decrypting the encrypted health data using the symmetric key) using the re-encryption key to generate re-encrypted health data; providing (e.g., by the processor) the symmetric key and the re-encrypted health data to the purchaser; and decrypting (e.g., by the processor) the re-encrypted health data using the symmetric key to generate decrypted health data (which can then be used by the purchaser). The NFT can be created using a blockchain (e.g., an Ethereum blockchain) using smart contracts. The method can further comprise: after decrypting the re-encrypted health data, encrypting (e.g., by the processor) the decrypted health data with the symmetric key to generate post-use encrypted health data; and/or sending (e.g., by the processor) the post-use encrypted health data to the IPFS with the symmetric key and storing the post-use encrypted health data and the symmetric key on the IPFS. The re-encrypting of the patient-generated health data can be performed using a re-encryption oracle. The method can further comprise: before re-encrypting the patient-generated health data, sending (e.g., by the processor) the encrypted health data and the symmetric key from the IPFS to the re-encryption oracle (the re-encryption oracle may then use the symmetric key to decrypt the encrypted health data back to the patient-generated health data before re-encrypting patient-generated health data). The generated of the encrypt (ed) data with the shared key can be performed using a multi-party authentication server. The generation of the re-encryption key can be performed using the multi-party authentication server. The method can further comprise: before generating the re-encryption key, sending (e.g., by the processor) the shared key to the multi-party authentication server; and/or before re-encrypting the patient-generated health data, sending (e.g., by the processor) the re-encryption key to the re-encryption oracle from the multi-party authentication server.

BRIEF DESCRIPTION OF DRAWINGS

In FIG. 3, CID represents content identifier, and NFT represents nonfungible token.

In FIG. 5, DR represents data requestor.

In FIG. 7, ETH represents the cryptocurrency Ethereum.

DETAILED DESCRIPTION

Figure 1:
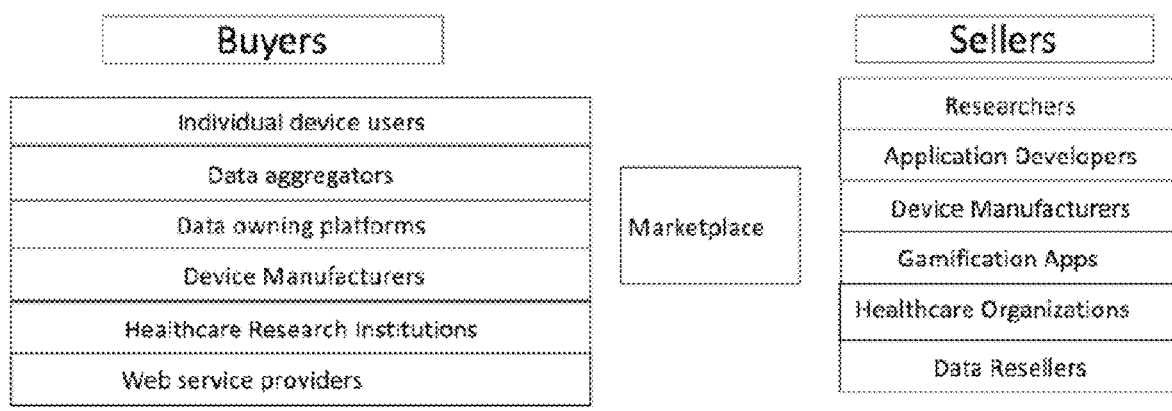
FIG. 1 shows a representation of a decentralized health care data marketplace, according to an embodiment of the subject invention.

Embodiments of the subject invention provide novel and advantageous systems and methods for providing a decentralized marketplace for patient-generated health data that can improve provenance, data accuracy, security, and privacy. The systems and methods can store medical records on an interplanetary file system (IPFS) and/or blockchain, with the ability to encrypt and decrypt data on the IPFS and blockchain. This can securely associate and/or dissociate users from their "owned" property, securely transfer the ownership of records, securely share the records to other users, facilitate payment for nonfungible token (NFT) records, and/or facilitate transfers to aggregators of health records. Additionally, the provenance of an article is verifiable. A unique encryption algorithm for data transfer (e.g., internet protocol (IP) transfer) can be used with data transfer on top of the blockchain. An NFT technology can be combined with data storage (e.g., public data storage) in an IPFS to accomplish the secure storage, ownership, and transfer of health data. This encryption algorithm and the underlying IPFS technology can drastically reduce costs for healthcare organizations overall.

A design science research methodology was used to define and prototype the decentralized marketplace, and the Ethereum blockchain, solidity smart-contract programming language, the web3.js library, and node.js with the MetaMask application have been used to show the systems and methods work. A decentralized health care marketplace catering to health data has been implemented, using an IPFS to store data, provide an encryption scheme for the data, and provide smart contracts to communicate with users on the blockchain (e.g., Ethereum blockchain). A decentralized marketplace for trading patient-generated health data can be implemented using smart-contract technology and IPFS-based data storage. Such a marketplace can improve quality, availability, and provenance and satisfy data privacy, access, auditability, and security needs for such data when compared with centralized systems.

Pervasive devices and wearables create health data that can be combined with electronic health record data to improve disease predictability. Such data can be used to create a patient-centric health system in addition to managing population health. There are limited examples of patient-generated health data (PGHD) in clinical settings; however, recent advances in predictive analytics and health informatics have found numerous uses for such data. For example, mobile data may be used to predict and provide early warning signs of diseases such as hypertension, diabetes, cancer, and other heart ailments. PGHD assets can become important value-adding differentiators for health care-related businesses, adding value across the healthcare value chain. However, the design of centralized warehouses to support clinical and translational research suffers from many challenges, including "organization of data," "access control," "oversight and governance," "sharing of data," "service management between different bodies such as informatics and bio-statisticians," and "technology challenges of maintenance, upgradation, and storage". In addition, various challenges exist with data structure organization, validation, security, and privacy. PGHD available for real-time analysis may be challenging because device manufacturers often control all data supply, or data are often deleted because edge devices (mobile and pervasive) are not designed to include long-term memory storage.

Mainstream clinical health care repositories, such as a research patient data repository (RPDR) and health information exchanges (HIEs), are examples of large complex data warehouses often governed by consortiums. RPDRs specify rules for data collection and access among members, which are focused on the clinical data field. In the RPDR, health care data storage and analysis are distributed among consortium members, with specific well-vetted guidelines for data access. An integrated data repository can be created with the following steps: data extraction, deidentification, ID assignment, transformation, ontology mapping, linkage, and loading into warehouses, among the stages for data retrieval. Recent innovations in web service-based application programming interfaces (APIs) and the evolution of standards have provided standards such as Fast Healthcare Interoperability Resources, which enable third-party systems to access clinical health care data. However, these mechanisms depend on the ability of independent data stores, hospital systems, and data intermediaries to satisfy legal mandates. Access mechanisms cannot be applied to patient-generated data where data are stored by device manufacturers or third-party vendors.

Pre-aggregated anonymized health data sets are available for sale and subscription through Amazon Web Services such as Qiagen, IBM Watson, Medisafe, and Annotate-it. Such data can be used for analysis in several domains, such as cardiology or pathology, to discover and predict diseases using sophisticated machine learning models. Centralized data stores, such as research data repository and HIEs, are alternatives, but hospital systems usually store clinical data, not PGHD. In addition, PGHD data sets need not provide the necessary provenance (e.g., one cannot request the source or transmission records for data because they are subscription-based). Similarly, it would be difficult to verify the recency of such data because they are already curated from publicly available information or by the firm offering subscription-based services. Prior research has recommended standardizing formats for data storage to exchange health care data (such as the Health Level Seven (international standards for transfer of clinical and administrative health data)) and to create APIs such as Fast Healthcare Interoperability Resources that can seamlessly operate across clinical systems; accomplishing such a standard would need legal mandates.

Embodiments of the subject invention provide systems and methods for a secure public blockchain infrastructure-based PGHD marketplace that can address several issues concerning data reliability, privacy, provenance, and availability. A user-level encryption schema can be used that enables a seamless exchange and monetization of health data by creators. Users are incentivized to produce high-quality data sets on the supply side of such a marketplace. On the demand side, users experience reduced search costs and can locate and trade with high-quality data providers at a lower price because of competition and choice.

A marketplace approach can be advantageous for many health data-quality concerns and issues through: (1) market-induced competition in a decentralized marketplace resulting in increased availability; (2) being backed by privacy and an encryption schema that protects data provider privacy and ownership; (3) a reputation mechanism for data sets and market participants; and (4) enabling monetary incentives for participants, including the infrastructure provider or marketplace creators.

In a health data marketplace, different sellers, buyers, and (value-added) service providers congregate to cocreate value for the entire ecosystem. Users who own health care record data can assign agents to operate on their behalf or directly benefit economically by having the ability to sell such data. Data aggregators, health care data repository owners, or storage providers can monetize health data by enabling value-added services, such as applying intelligent data analytics and prescriptive or diagnostic machine learning technologies to their data. A PGHD marketplace has to adhere to the legal requirements of privacy and data access. However, substantial private trade in health care technology, curated data sets, and secondary uses of such data sets have existed for a time. Private entities with resources, that is, both human resources and financial and technical know-how, have been able to arbitrage the advantages of such PGHD data sets by solving unique predictive problems.

Technology has enabled autonomous driving with high accuracy, but it is not yet possible for automated disease diagnosis or prediction without specialist intervention from data. The lack of automated diagnosis from PGHD data increases the costs of diagnosis, not to mention delays in diagnosis. In addition, such asymmetrical market power between resourceful players and smaller health care analytics startups can reduce the discovery time for newer data-driven models for diagnosis. Often, health data sets are expensive and do not provide any value to creators. For example, the health data set for predicting heart disease costs $500 (USD) per hour for use on Amazon Sage Maker.

On the seller's side, data providers, aggregators, or intermediaries cannot monetize the precious data created. Another issue is that of provenance, where it is not possible for the analyst or others to truly validate or ascertain, under confidentiality, the creator of such data. Similarly, on the buyer's side, small- and medium-scale businesses and research projects that need large data sets to perform experimental analysis face an entry barrier because of the lack of data provenance. Clinical studies are backed by stringent data disclosure and ethics reviews, where such reviews provide value in preventing data fabrication and unethical uses of data. Applying similar stringent data disclosure standards to collect and access PGHD may be possible if a marketplace approach is used, wherein users are compensated for sharing their own data, and moderation mechanisms filter out fabricated data. In many fields of medicine and health care, such as digital pathology, the lack of a large corpus of data for training algorithms in image detection and pattern analysis, owing to lack of data, is challenging. However, recent improvements in using patient health data are visible in research done by Google Inc and Apple Inc. The lack of automation increases the cost of care and, in many cases, prevents improvements to health care that are technically feasible yet lack data accessibility, data provenance, and data quality.

The unique properties of a PGHD marketplace include its ability to preserve data privacy, access control, data storage, and fault tolerance. Buyers who purchase and use such data to develop useful classification algorithms monetize the data. In addition, such analytics enable various auxiliaries, such as analytics for diagnoses, disease prediction, and gamification of health care services. Blockchains are a new distributed and decentralized technology used to address the challenges of data standardization, system interoperability, security, privacy, and accessibility. Before the advent of blockchains, providing anonymized, privacy-controlled single points of access for different data sources for each user was a challenging problem. Embodiments of the subject invention provide a decentralized blockchain-based marketplace. A decentralized marketplace enables faster matching of buyers and sellers of data, seamless transaction efficiency, and institutional infrastructure features, such as provenance, privacy, access control, and perennial storage.

FIG. 1 shows a representation of a decentralized health care data marketplace, according to an embodiment of the subject invention, including the two sides of such a marketplace and the actors in the marketplace. Marketplaces are two-sided, with buyers on one side and sellers on the other. Buyers can purchase data to modify, analyze, and sell downstream or use it for research and other purposes. The buyer side includes service providers, such as data aggregators, individual patients who can share personal health care data, firms that provide predictive analytics for data, and application developers or researchers or data scientists who analyze data and add value. The buyer side can also include specialists who resell data, data aggregators, game developers, and research institutions. The scope of the data seller entails only PGHD, in which the patient is responsible for creating such data using personal devices. Others, such as health research institutions, web service providers, and data aggregators, form a part of the supply chain wherein the patient authorizes them to intervene.

The burden of the cost of data storage for centralized and managed health information systems such as the RPDR or HIEs usually falls on the patient or the end user. A marketplace is not feasible in such data architectures because HIEs specifically cater to clinical health care data not PGHD data. Centralized data stores often do not cater to PGHD, which can come from either the patient's own health device or from another device, such as a publicly available blood pressure monitor, commonly found in grocery stores. However, very often, such data can provide valuable insights into user health and when services are aggregated into apps, such as the one by Google or by Sleep Tracker.

Blockchains provide various benefits when user data are involved, allowing users to store large quantities of data. However, such benefits are not transferred to pervasive devices and ubiquitous applications that are designed with security, access, privacy, and performance considerations There are three main dimensions to data quality in decentralized marketplaces: (1) information quality, (2) security, and (3) communication. Information quality refers to the following 7 characteristics:

Usability: the more usable the data, the more buyers there are for such data. Owing to the digital nature of the data set, data can be replicated easily and sold to downstream users either as is or by adding other features and analytics, such as tags.

Timeliness: sellers must ensure the timeliness of data that are submitted for sale on the market. Otherwise, they will lose out on more current data. In addition, blockchains record and timestamp every record that has been uploaded, preventing users from altering the actual event in the data set.

Relevance: sellers will only share or upload relevant data for sale in the marketplace. Irrelevant or falsified data records will be penalized by other users and can affect user reputation in the marketplace.

Consistency: data will have to be consistent by ensuring that similar data formats are used. Marketplace operators can enforce templates or buyers can solicit data in particular formats. Consequently, users will only upload consistent data to the marketplace.

Completeness: the data will have to be complete, and users can seek panel data. Data providers will be either individual users or intermediaries.

Accuracy: the data can be checked for accuracy on the blockchain because transaction rules can be written into smart contracts. Basic syntax checking and advanced analytics-based checks can be conducted on these data.

Access rights management: user- or firm-based encryption at the wallet level encrypts data. Similarly, only those with private keys will have access to it.

Security refers to the following 4 characteristics:

Privacy: the blockchain, by design, ensures that data are accessible by only those who possess the keys. In addition, an encryption mechanism implemented by the module makes the data inaccessible to other users. Privacy can also be ensured by preventing deanonymization of data by fixing access through encryption keys and by allowing only the data owners access.

Confidentiality: the decentralized marketplace app can encrypt or decrypt the data with the user's private key to ensure the confidentiality of data to only those who possess access.

Secure access: access to data is plausible only through a secure private-public key maintained by the user. Data encrypted by a user can only be unencrypted through the platform or when the user provides the buyer with a key offline.

Governance of data: the marketplace can ensure a governance model, such as a consortium-based decentralized autonomous organization, is responsible for all major governance decisions. Such mechanisms have been used in large public blockchain projects, such as the maker foundation.

Data communication refers to the following 3 characteristics:

Provenance: the digital transaction records on the blockchain will enable data to be traced back to the source on the blockchain.

Interpretability: the different people in the network chain must interpret the data in a similar manner through a protocol.

Transmissibility: the data are transmissible to other owners using the blockchain. Systems and methods of embodiment of the subject invention use design science methodology from information systems and computer science for a decentralized marketplace. Blockchain technology offers the possibility to verify transactions through a decentralized network (for 34 stakeholder-specific requirements, see also Beinke et al., Towards a stakeholder-oriented blockchain-based architecture for electronic health records: design science research study, J Med Internet Res 2019 Oct. 7, 21(10):e13585; which is hereby incorporated by reference herein in its entirety). A PGHD marketplace of embodiments of the subject invention can have the following features:

Feature 1: data access—data access must be allowed between different sellers and buyers, that is, buyers must have the right to access the data they purchased and sellers should have the ability to own and control the data and copies of data. Buyers and sellers can create and hold data only they can access. This creates a marketplace where true ownership is recorded on the blockchain and is verifiable by anyone.

Feature 2: marketplace workflow functionality—marketplace functionality for data should be enabled, that is, sellers should offer a pricing mechanism (either fixed or auction-like) to trade data, and buyers should be able to purchase the same with cryptocurrencies. Data should have value (a floor price) in the system, and the data owner (creator) should access the value. Those who purchase data can pay for the data on the platform. Similarly, payment and transfer of the service are fully automated and do not need an intermediary to validate and transfer transactions.

Feature 3: data encryption support—support for data encryption to ensure that only the owner can access the data and other users cannot see the data. The data encryption schema for publicly stored information is a critical component for maintaining data privacy.

Feature 4: Health Insurance Portability and Accountability Act (HIPAA) compliance—support for HIPAA compliance by providing users with information privacy and the ability to purge data from the marketplace offering. The system should adhere to different criteria laid out by HIPAA-compliant mobile use.

Feature 5: reputation model—support for reputation model and data fabrication defenses. The validity of the data provider (patient) or patient representative must be checked in the marketplace. Similarly, data fabrication cases should be penalized upon detection.

Embodiments of the subject invention can use NFT standards (e.g., Ethereum Request for Comments (ERC)-721, ERC-732, and/or ERC-1155) optimized for PGHD data for decentralized health care marketplaces where there are sellers, buyers, and value-added service providers, among others (see also FIG. 1). Each participant in the marketplace (e.g., seller, buyer, or value-added service provider) can be identified by their wallet addresses (a modified version of their public key on the blockchain). Marketplace participants adhere to privacy, data security, and other features required by laws, such as HIPAA and General Data Protection Regulation. A digital pathology system using an IPFS and a blockchain (e.g., Ethereum) can be used for a full marketplace based on smart contracts with user encryption of data, the IPFS to store the data, and an interface (e.g., web3 interface) to enable interactions between buyers and sellers. Transaction fees needed to operate a public blockchain infrastructure can be reduced (e.g., to a few cents on Ethereum version 2 (proof of stake)).

The blockchain network helps enable a decentralized marketplace, and decentralized markets powered by smart contracts (e.g., blockchain-based smart contracts, such as Ethereum-based smart contract) can help enable NFT markets to make them function. The blockchain (e.g., Ethereum blockchain) enables a wide range of transactions via smart contracts and self-executable Turing-complete programs, which run on a virtual machine (e.g., the Ethereum virtual machine) and maintain a state in their storage. The Ethereum virtual machine has a stack-based architecture and can store things on the stack (e.g., using bytecode operations), in memory (e.g., temporary variables within functions), or in storage (e.g., permanent variables holding database entries). Each smart contract can read and write data only to its smart-data structure. The network consensus mechanism determines which user in the network will append the transactions to the chain as a new block. Ethereum has a proof of stake mechanism, which substantially reduces energy consumption. With proof of stake, a network algorithm determines which node will add the block to the chain based on the node's stake, a combination of parameters, including their account balance. The transaction fee for smart-contract operations, such as minting, transferring data, and creating an on-chain record, is a fraction of a cent on Ethereum proof of stake.

Smart contracts provide an opportunity to develop applications with complex functionalities in a blockchain network. Using Ethereum smart contracts, the ERC-721 standard can be implemented, which can allow for storing, minting, listing, trading, and burning health care data. Recurring revenue for data creators and owners can be implemented, and the provision of quality-of-service paradigms can be facilitated for the market. The life cycle of an NFT is presented in a list here in the context of the tokens on the network. The details of each stage are provided:

Storage: the data are uploaded onto IPFS and are kept there for storage.

Mint: the content identifier (CID) returned by IPFS is returned to the blockchain. The token is minted.

List: the minted token is used to list the data set for other users to purchase on the blockchain. This listing will use MongoDB to store and retrieve for the user interface and list the data on the blockchain.

Trade: users who purchase the token will be able to do so using their crypto token balances from their wallets. Then, they will be able to transfer the token ID's ownership (and hence, data access) to themselves. Such data access will be recorded on the blockchain.

Burn: finally, the token, based on the owner's choice, can be burned, and access can be removed from the actual data set by transferring the token to a NULL address.

Figures 2A, 2B, 2C:
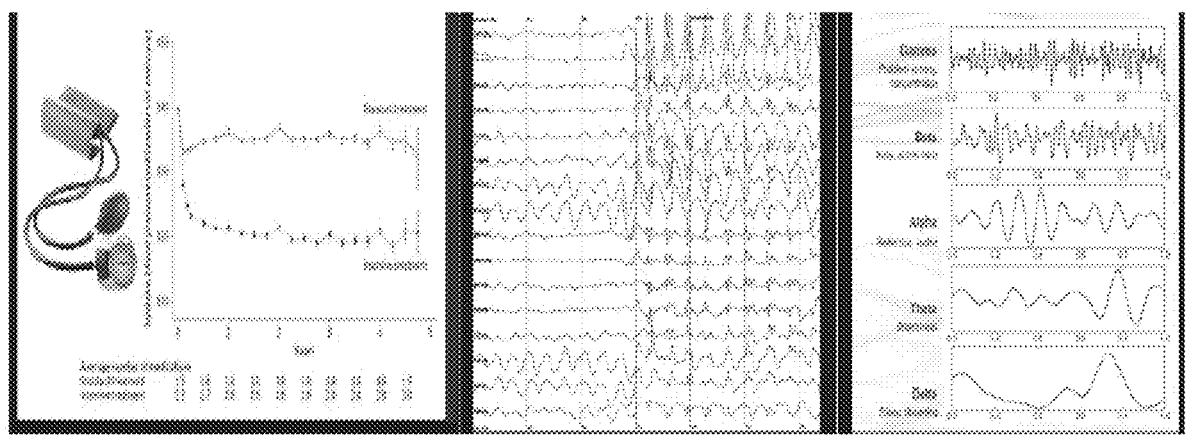
FIGS. 2A, 2B, and 2C show blood pressure data, electroencephalograph data, and brainwave data, respectively, pertaining to a patient collected on his or her own personal device(s).

FIGS. 2A-2C depict different variations of types of data that can be stored on the blockchain. The metadata separates the ownership of data from the user uploading the data to the marketplace. Buyers of these data can use it to analyze and provide value-added services to end users of the marketplace. They can also reupload data to the marketplace or relist data as is. The marketplace provides financial incentives to data creators and marketplace-hosting agencies to ensure that the system works per design. Similarly, each time a data owner uploads data, they can claim a royalty on each future sale. Similarly, the marketplace wallet can receive a fixed amount of cryptocurrency as a commission per sale, making it financially feasible to maintain future requirements for the platform.

Figure 3:
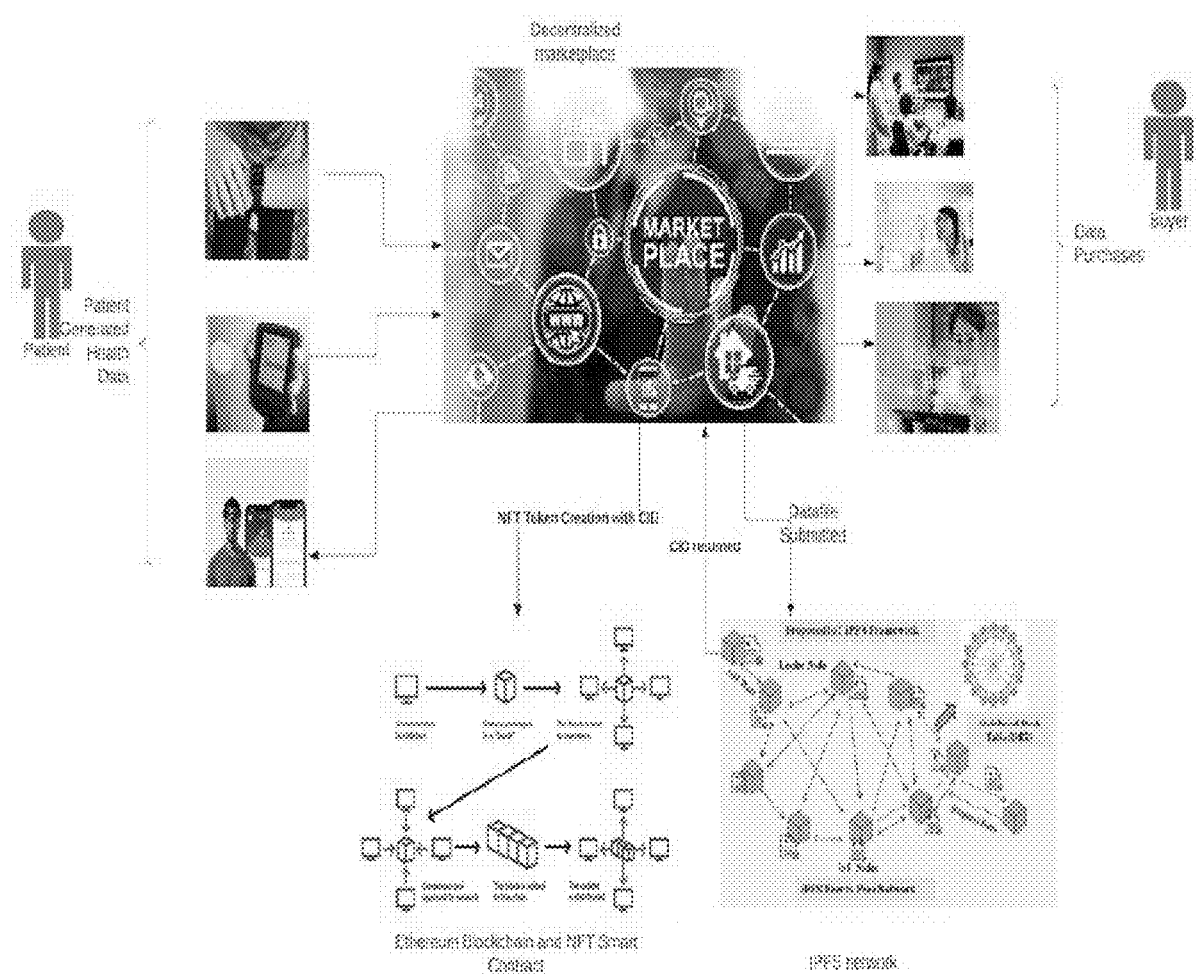
FIG. 3 shows a diagram of transactions among data creators, buyers, the interplanetary file system (IPFS), and the blockchain, according to an embodiment of the subject invention.

Sellers can set prices for the data sets listed, and once a sale transaction occurs, the cryptocurrency will be transferred to the seller after deducting platform fees and royalty fees preset in the smart contract. The architecture of such a marketplace is illustrated in FIG. 3. The PGHD data are stored in the IPFS, and the data identifier CID is stored on blockchain (e.g., Ethereum blockchain) within a smart contract (e.g., ERC-721). The marketplace connects the data creators and the buyers through the IPFS and Ethereum infrastructure. The data can be encrypted on the IPFS.

The PGHD can be stored on the IPFS, and the corresponding token ID can contain the metadata associated with the data owner. Similarly, each time the record or the token changes hands, the token can be transferred to a new owner, and the new owner can access the data. In between the data transfer, the encryption protocol is invoked, which generates a new pair of keys and provides the new owner with the key to decrypt the data. Consequently, the blockchain records the owner of the data, which in turn points to the CID on the IPFS. The marketplace creator can use a database, such as MongoDB, to store the mappings of user wallets, CIDs of data, and corresponding price variables. This database is not absolutely essential (i.e., it is optional) but can be used to supplement data stored on the blockchain for faster lookup and querying or searching of data to provide ease of use to the user.

Users can upload multiple copies of their data to the IPFS. Each copy of the data must go through the minting workflow. In the minting workflow, data are newly uploaded onto the IPFS and encrypted with a different key. Later, this new IPFS CID can be minted as a separate token for listing. The platform does not restrict offering multiple data sets belonging to the same user. However, marketplace moderation mechanisms can flag duplicates uploaded onto the system or can potentially affect the reputation of the user.

Figure 4:
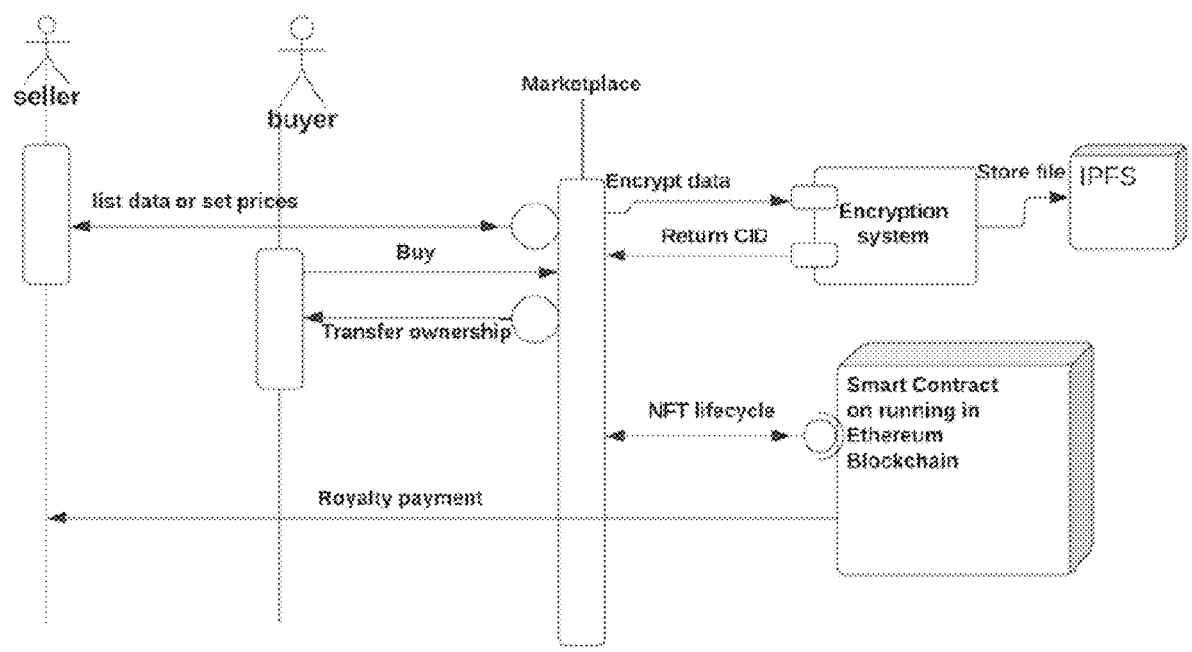
FIG. 4 shows a design schematic and architecture of a decentralized marketplace, according to an embodiment of the subject invention.

FIG. 4 shows a schematic and user flow of a PGHD marketplace, according to an embodiment of the subject invention. Creators of data or owners of digital data, for example, patients and hospital systems, can list their data on the marketplace using an easy-to-use user interface. Sellers are identified on the blockchain through a know-your-customer and anti-money laundering mechanism as well as their wallet addresses associated with their purchases. A preview image illustrates the sample data sets used. The actual data set forms a part of a text entry (e.g., a JSON text entry). The data are stored on the IPFS, a distributed file system hosting peer-to-peer file storage. If the public IPFS is not sufficiently performant, marketplace creators can use layer 2 solutions, such as Filecoin, ArWeave, and Storj. As data scale to petabytes or exabytes, a layer 2 solution will be required because the IPFS may not be performant enough in terms of response times for the download of data unless the marketplace provides its own hosting and pinning service.

Similarly, the buyers of data purchase the data from the owner. In the process, the NFT's ownership is transferred to the buyer, which is recorded on the blockchain. In addition, we have third-party data validators and analysts such as "value-added service" providers who will purchase the data from the marketplace, perform operations such as data-oriented simulations, data mining, or cleaning of data and relist them or resell them downstream.

Figure 5:
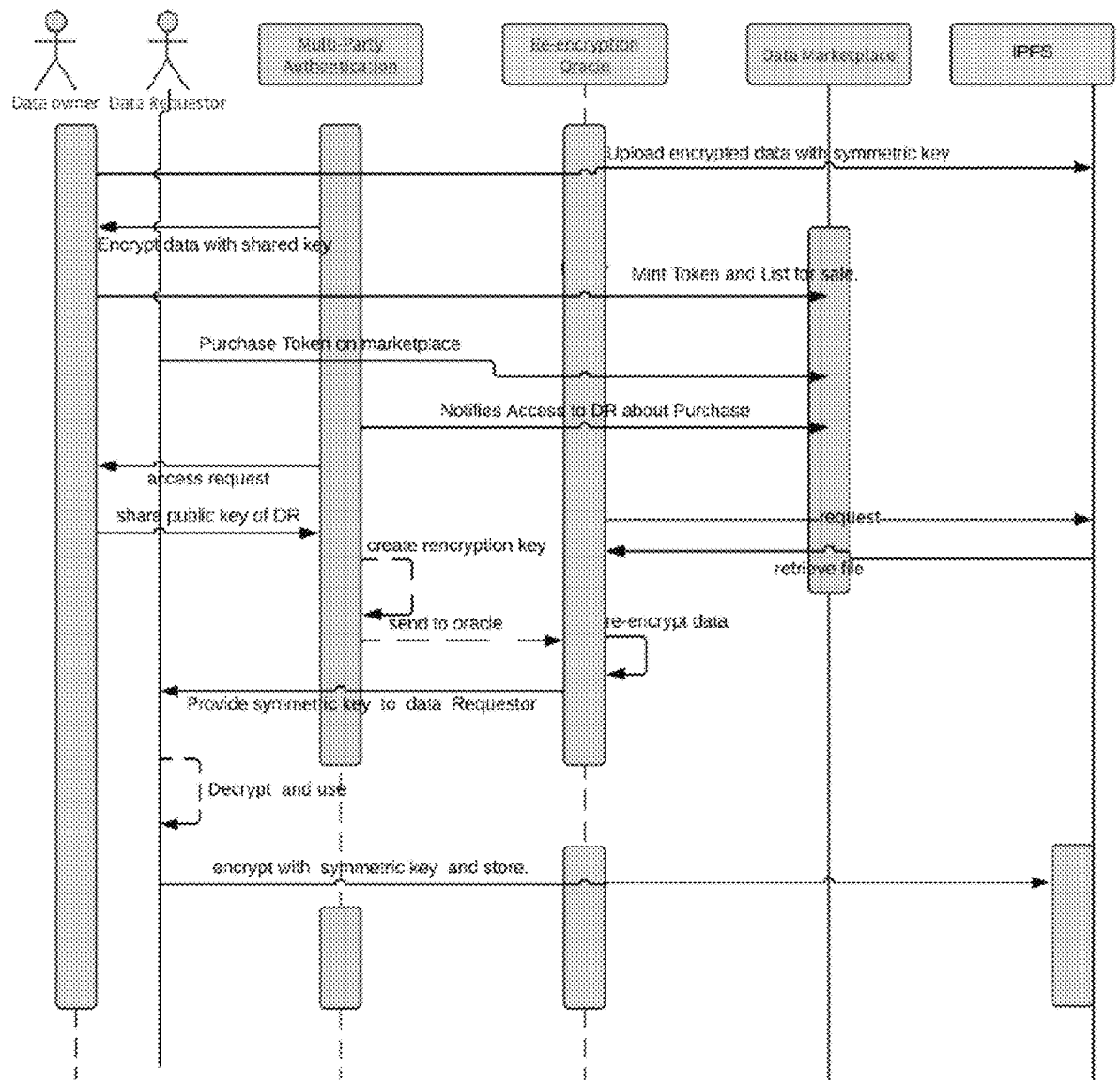
FIG. 5 shows an activity diagram for data encryption flow in a data marketplace with a buyer and a seller, according to an embodiment of the subject invention.

Various trade-offs should be managed adaptively to improve electronic medical record utility. Although these trade-offs can result in improved blockchain security, some of these features can affect scalability. Different approaches exist for encrypting IPFS data records using various encryption methods and different storage solutions. One approach is to create a directory-based file system and to use the bit swap protocol built on the IPFS to transfer encrypted records among users. Embodiments of the subject invention can apply any suitable encryption approach. In certain embodiments, a modified version of a multiparty authentication and re-encryption oracle can be used (see also Battah et al., Blockchain-based multi-party authorization for accessing IPFS encrypted data, IEEE Access 2020 Oct. 27, 8:196813-196825; which is hereby incorporated by reference herein in its entirety). The activity diagram for the encryption schema, according to an embodiment of the subject invention, is shown in FIG. 5. The main entities in the multisignature system are multiparty authentication servers, the re-encryption oracle, the data owner, and the data requester.

Referring to FIG. 5, the data owner (seller) uploads the data and agrees with access requirements posed by the multiparty authenticator or multiparty authentication server. The data owner registers the address of the data (which is the hash of the data) on the blockchain by minting the token once the multiparty authentication server and encryption oracle encrypt the data. There is always a shared wallet between the multiparty authenticator and the data owner on the system, which is used to encrypt the data (once the data owner submits the symmetrical key-encrypted data onto the IPFS). This second stage ensures that the data can be securely decrypted and re-encrypted using another pair of keys without access to the original data owner.

Further, the data owner (seller) creates a smart contract that contains the hash of the mentioned components to act as the address of the data by minting the NFT as per the ERC-721 protocol. Once a sale is finalized (or a purchase action occurs), the data owner creates a re-encryption key from the public key of the data requester (buyer) and its own private key to send to the re-encryption oracle. This symmetrical key is then used by the re-encryption oracle and is shared with the buyer. Once the data are downloaded from the IPFS, the requester downloads the encrypted data, encrypted symmetrical keys, and the hash of the file. Subsequently, it decrypts the symmetrical key along with the data using its private key and decrypts the data again with that symmetrical key. The data requester (buyer) can then either choose to relist these data or use them for the analysis.

Reputation models enable buyers and sellers to evaluate each other and make informed decisions about transactions.

1. Rating and review systems: in this model, buyers and sellers can rate and review each other based on their experiences with the transaction. This allows other users to see the average rating and read reviews to help them gauge the reputation of a particular user. However, a weighting mechanism that weights subject matter experts, along with retail users (buyers or sellers), could prevent fraudulent reviews. Such a system will also need both manual and third-party moderation for the verification of content.
2. Verification systems: the marketplace can adopt verification systems to confirm the identity and credentials of users. This can help to build trust and may improve the reputation of verified users. An anti-money laundering or know-your-customer system that ties into the social security network or the credit profile can help validate real users or firms.
3. Feedback systems: feedback systems allow users to provide detailed feedback about their experiences with specific transactions. This feedback can be used to inform other users about the reputation of a particular user.
4. Trust networks: trust networks are systems that allow users to build relationships with each other and establish a reputation based on those relationships. Such trust networks within the context of a marketplace can enable supply chain kind of activities wherein buyers repeatedly trade with similar sellers, and sellers are able to preorder data sets to meet their analysis needs in the future.
5. Social media integration: marketplaces can integrate with social media platforms to allow users to connect their accounts and build their reputation based on their activity on those platforms. In the current design of a marketplace, we have integrated users with the social media platform.
6. Penalizing fraudulent data submitters: marketplaces can levy fines or completely blacklist users who engage in fraudulent data practices, such as offering fabricated data.

A platform-level data-correctness strategy includes a combination of reputation mechanism design, statistical validation for data, onboarding validation for the data seller through third-party oracles, and penalization of the vendor upon detection of fraud by third-party vendors. In our design, we enabled the data description metadata entered by the user, which can be used to validate the data by third parties.

Two smart contracts can be created, one in which the value is transferred between the buyer and seller and another in which a proportion of the sale price at each transaction is transferred to the original creator (owner) of the data. This mechanism gives the data owner a market mechanism and an incentive to offer their data to the marketplace. Royalties to downstream and upstream sellers for personal data incentivize all players in the marketplace.

Each user in the marketplace can be registered, along with the user's wallet ID and social media profiles, to enable the user to list data. The data listed each time can be validated for fictitious or simulated data through a combination of third-party validation oracles and statistical analysis techniques to detect patterns of fraud. FIG. 1 shows the user registration flow in the system.

Figure 6:
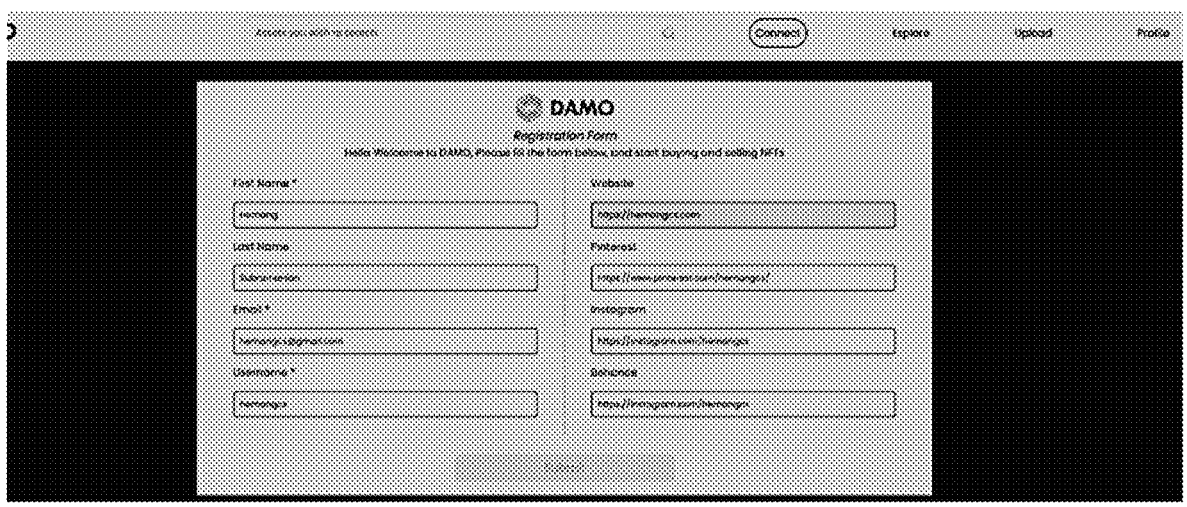
FIG. 6 shows an image of a screengrab of user preregistration with a social media profile to check validity.

When the PGHD data record is uploaded onto the IPFS, in the backend, a record on the blockchain will point to the unique CID on the IPFS. If the web service provider or marketplace wants to enable users to transact, the provider can pin the record onto a particular hosted node on the IPFS. IPFS functionality, data storage, and use in the context of digital pathology. A mechanism was used for marketplace functionality and data storage, where metadata are stored, specifically pointing to the actual data on the IPFS (see also Subramanian et al., Improving diagnosis through digital pathology: proof-of-concept implementation using smart contracts and decentralized file storage, J Med Internet Res 2022 Mar. 28, 24(3):e34207; which is hereby incorporated by reference herein in its entirety). The CID pertaining to the metadata will reside in the blockchain record and is minted as an NFT (FIG. 6).

Figure 7:
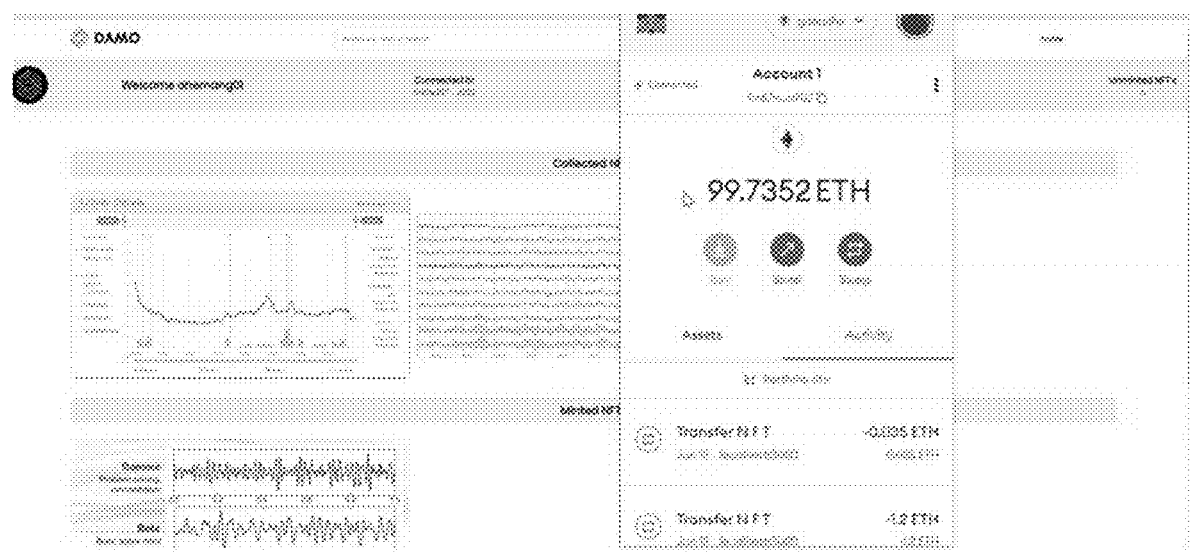
FIG. 7 shows an image of a screengrab of user flow depicting data upload and mint functionality.

FIG. 7 shows a screenshot of the user interface in which users, upon logging into their wallets and identifying themselves, can see all the minted tokens. Each minted token is associated with an IPFS record that contains metadata pertaining to the uploaded data set. Furthermore, FIG. 2 shows the interaction in which the data are purchased using the wallet balance and the transfer of NFT. In addition, when data are uploaded onto the IPFS, the tokens cannot be minted because of issues such as network connectivity, insufficient wallet balance, or high network traffic. The unminted tokens could later be minted by supplying sufficient balance to the user and later be used for listing on the decentralized marketplace.

Figure 8:
FIG. 8 shows an image of a screengrab of a user interface listing all the minted tokens on a network. Each user gets a separate listing, excluding their owned tokens available for sale in the marketplace.

FIG. 8 shows the user interface of the decentralized marketplace displaying the listings. Although this user interface is implemented in hypertext markup language (HTML) or Cascading Style Sheets, the web3 platform responsible for creating the listings platform can also supply a Representational State Transfer API for third parties to create and display listings.

There are three categories of assets in the marketplace, unique to each wallet. The first category is "minted" NFTs that an owner can list in the marketplace for immediate transactional sale by a different user. Similarly, the second category is "collected NFTs," which are just collections of digital health data attributed to the user but are not currently listed for sale. The third category of data accessible to the user not minted yet is listed as "unminted." These records are not yet available on the blockchain for transactions. The JavaScript interfaces with the IPFS and the web3 smart contract and enables users to mint, list, and purchase tokens.

HIPAA requires covered entities to protect individuals' health records and other identifiable health information by requiring appropriate safeguards to protect privacy and by setting limits and conditions on the uses and disclosures that may be made of such information. Systems and methods of the subject invention, in which personal device-generated data are uploaded into the IPFS, are encrypted and stored on the web. The blockchain provides a web-based transaction history of the data. For example, the minting of the aforementioned token is recorded on the blockchain and can be viewed on the Ethereum blockchain. The six aforementioned records that were minted with different Ethereum prices can be located by scanning the contract address on the network. It can be examined which wallet transferred the newly created and minted NFT. In addition, each time the data are transferred, the original data owner earns a royalty, and the platform's wallet also earns a share of the revenues.

Figure 9:
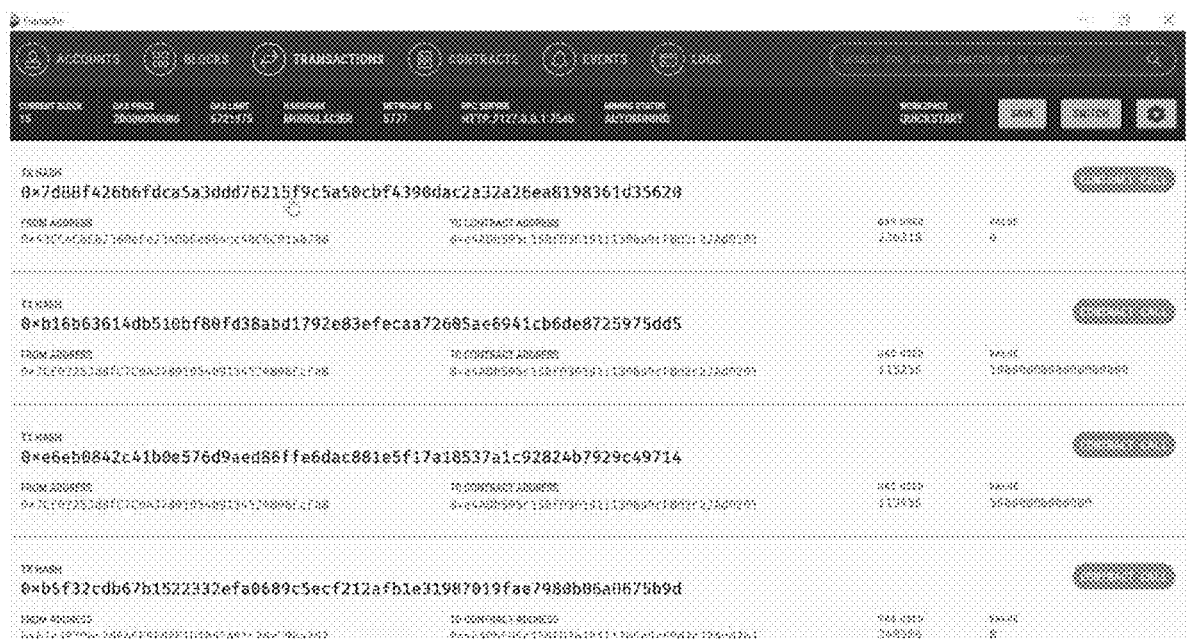
FIG. 9 shows an image of a screengrab of a contract address and transactions that are done with respect to NFT creation.

FIG. 9 illustrates the creation of the contract and the set of transactions performed on the same.

Marketplaces of systems and methods of embodiments of the subject invention support the following requirements with respect to PGHD as follows:

Use a password or other user authentication: data owners access the marketplace with their private keys. Similarly, sellers, buyers, and value-added data service providers all access the marketplace using private keys.

Install and enable encryption: all data can be encrypted as per the encryption design. The section on Health Data Encryption discusses how the data are encrypted and re-encrypted. At the storage level, users could choose to encrypt and send data using their public key (or a separate key), and their wallet software could enable access to these data later. Similarly, users could list a representative graphic at the marketplace level and encrypt the actual data for storage ion the IPFS.

Install and activate remote wiping or disabling: as discussed, data can be deleted at the marketplace level by the owner using the burn functionality of the NFT, which removes the listing. However, the data can never be fully deleted from the IPFS, which replicates and stores data across nodes. Only data residing on pinned nodes can be deleted and submitted for garbage collection. Once the token is burned, the keys to decrypt the data are also deleted by the multiparty authentication, making these data inaccessible. The platform never sets an automatic burn for the token, rather the owner can invoke the burn by design.

Install and enable a firewall: firewalls are installed by hosting providers or app providers if they choose to expose the marketplace via an app.

Install and enable security software: the marketplace user interface operates via http secure and a web application. The security software and firewalls are installed on the server, which runs the user interface for the marketplace that interacts with the backend blockchain. In addition, third-party smart-contract security mechanisms help audit the blockchain's software contracts, enabling the Ethereum virtual machine to ensure compatibility (both forward and reverse).

Keep the security software up to date: when updated, the blockchain software or IPFS will automatically update the required software. For example, the Ethereum blockchain moved to version 2 since the last submission, and the IPFS released its newest version. However, the marketplace user interfaces are controlled by those who enable a user interface, who are responsible for updating the software as per the new infrastructure protocols.

Maintain physical control: access to data is controlled by the user who owns the private keys of the wallet, which uploaded the data onto the platform. The web API or marketplace user interface providers do not own or control it. Access monitoring is an additional responsibility, which the blockchain in itself does for all data that move through its system.

Use adequate security to send or receive health information over public Wi-Fi networks.

There are no data transferred to the public Wi-Fi networks, except when the record is uploaded onto the IPFS or downloaded by the buyer. It is encrypted whenever the data are uploaded and when they are downloaded or encrypted for later decryption. The encryption schema discusses the same.

Delete all stored health information before discarding or reusing it: while the token can be delinked and delisted from the marketplace, actual data on the IPFS can never fully be deleted. Once the token is delisted, the re-encryption oracle will not enable anyone to re-encrypt the data, since the smart contract will not be able to detect the token (refer to the Health Data Encryption section). In addition, the MPA service can delete the encryption keys, thereby making it difficult to erase the data. Thus, although data continue to reside on the IPFS, it will not be accessible for decryption or later use.

Decentralized marketplaces require governance structures that are not centrally controlled and managed. Governance structures provide oversight, management control, approvals for enhancements to the platform, reward mechanisms, and a formal structure answerable to the law of the land. A consortium-based approach could be used in which representatives of health data providers, buyers, and value-added service providers participate in a voting-based decision-making system. Penalizing collusion can be a deterrent to any attempt to thwart decentralized governance. In a consortium-based governance approach, all stakeholders, including the legal community, public, buyers, and sellers, have a stake in the platform's decision-making process. Another approach is that of a decentralized autonomous organization, where governance tokens (using smart contracts) could be issued to users participating in the platform's governance.

Embodiments of the subject invention provide decentralized marketplaces for PGHD data, providing a mechanism by which different participants, such as data creators, sellers, and value-added service providers, can monetize data transparently. Similarly, embodiments attempt to support the HIPAA regulations that provide privacy, security, and legal protection to users, platform creators, and other stakeholders in the ecosystem. Such marketplaces can improve the quality of data available in the marketplace, and ensure that more high-quality data are available for artificial intelligence-driven analysis and diagnosis of diseases. Advantageous features of the decentralized PGHD marketplace include the following:

- In a health care data marketplace, not only do data providers such as patients, data aggregators, or data enablers benefit in deriving value for the data they create and own, but also intermediaries such as diagnostics laboratories, data aggregators, and application creators are benefited.
- The data provenance issue is mitigated because the blockchain supports traceability and historical audition of ownership changes and data origins.
- In the PGHD marketplace, the architecture facilitates different buyers and sellers to offer their data in the market, thereby keeping the markets more efficient in terms of access, price, and security.
- In the PGHD marketplace, data owners and those who submit data have the ability to earn revenue in the marketplace and royalties for the data they provide, thus monetizing their own health data.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

A prototype was implemented using an IPFS and Ethereum smart contracts to demonstrate decentralized marketplace functionality with the blockchain. All of Features 1-5 discussed above were demonstrated. In particular:

Feature 1: data access was fully implemented and demonstrated. Data access is permitted between different sellers and buyers; that is, buyers must have the right to access the data they purchased and sellers should have the ability to own and control the data and copies of data. Royalty is paid to the original creator of the data perennially on the marketplace, thus incentivizing data submission. Users can choose whether to list data that they own.

Feature 2: marketplace workflow functionality for data was implemented. Sellers offer a fixed pricing mechanism and buyers can use their personal balances to debit currency to buy tokens.

Feature 3: data encryption support was implemented to support multiparty authentication for access of data.

This supports data encryption to ensure that only the data owner can access the data, while other users cannot see the data.

Feature 4: HIPAA compliance was partially supported, as discussed. Certain limitations owing to limitations on the IPFS may inhibit full support of HIPAA functionality.

Feature 5: reputation model-various options were considered to create a reputation model on the platform but the user registration part that can be moderated was implemented. All social media information was collected to gauge user reliability on the platform and to validate users.

The marketplace addresses the key requirements and objectives that enable the monetization of health data in a fair and transparent manner. Similarly, it has all of Feature 1-5.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for providing a decentralized marketplace for patient-generated health data, the system comprising:
    a processor; and
    a machine-readable medium in operable communication with the processor and having instructions stored thereon that, when executed by the processor, perform the following steps:
    a) encrypting the patient-generated health data using a symmetric key;
    b) generating encrypted health data from the encrypting of the patient-generated health data;
    c) sending the encrypted health data to an interplanetary file system (IPFS) with the symmetric key and storing the encrypted health data and the symmetric key on the IPFS;
    d) generating encrypt data with a shared key and providing it to an owner of the patient-generated health data;
    e) creating a non-fungible token (NFT) and listing the NFT for sale on a data marketplace;
    f) facilitating a purchase of the NFT by a purchaser from the data marketplace;
    g) notifying the owner of the purchase;
    h) generating a re-encryption key from the shared key;
    i) re-encrypting the patient-generated health data using the re-encryption key;
    j) generating re-encrypted health data from the re-encrypting of the patient-generated health data;
    k) providing the symmetric key and the re-encrypted health data to the purchaser;
    l) decrypting the re-encrypted health data using the symmetric key;
    m) generating decrypted health data from the decrypting of the re-encrypted health data;
    n) analyzing the decrypted health data;
    o) Developing a classification algorithm for disease diagnosis based on the analyzing of the decrypted health data; and
    p) diagnosing a disease of a subject using the classification algorithm.

2. The system according to claim 1, the NFT being created using a blockchain.

3. The system according to claim 2, the blockchain being an Ethereum blockchain.

4. The system according to claim 2, the NFT being created further using smart contracts.

5. The system according to claim 1, the NFT being created using smart contracts.

6. The system according to claim 1, the instructions when executed further performing the following steps:
    q) after decrypting the re-encrypted health data, encrypting the decrypted health data with the symmetric key;
    r) generating post-use encrypted health data from the encrypting of the decrypted health data; and
    s) sending the post-use encrypted health data to the IPFS with the symmetric key and storing the post-use encrypted health data and the symmetric key on the IPFS.

7. The system according to claim 1, the re-encrypting of the patient-generated health data being performed using a re-encryption oracle, and
    the instructions when executed further performing the following step:
    t) before re-encrypting the patient-generated health data, sending the encrypted health data and the symmetric key from the IPFS to the re-encryption oracle.

8. The system according to claim 7, the generating of the encrypt data with the shared key being performed using a multi-party authentication server,
    the generating of the re-encryption key being performed using the multi-party authentication server, and the instructions when executed further performing the following steps:
    u) before generating the re-encryption key, sending the shared key to the multi-party authentication server; and
    v) before re-encrypting the patient-generated health data, sending the re-encryption key to the re-encryption oracle from the multi-party authentication server.

9. The system according to claim 1, the generating of the encrypt data with the shared key being performed using a multi-party authentication server,
    the generating of the re-encryption key being performed using the multi-party authentication server, and
    the instructions when executed further performing the following step:
    u) before generating the re-encryption key, sending the shared key to the multi-party authentication server.

10. A method for providing a decentralized marketplace for patient-generated health data, the method comprising:
    a) encrypting, by a processor, the patient-generated health data using a symmetric key;
    b) generating, by the processor, encrypted health data from the encrypting of the patient-generated health data;
    c) sending, by the processor, the encrypted health data to an interplanetary file system (IPFS) with the symmetric key and storing the encrypted health data and the symmetric key on the IPFS;
    d) generating, by the processor, encrypt data with a shared key and providing it to an owner of the patient-generated health data;
    e) creating, by the processor, a non-fungible token (NFT) and listing the NFT for sale on a data marketplace;

f) facilitating, by the processor, a purchase of the NFT by a purchaser from the data marketplace;
g) notifying, by the processor, the owner of the purchase;
h) generating, by the processor, a re-encryption key from the shared key;
i) re-encrypting, by the processor, the patient-generated health data using the re-encryption key;
j) generating, by the processor, re-encrypted health data from the re-encrypting of the patient-generated health data;
k) providing, by the processor, the symmetric key and the re-encrypted health data to the purchaser;
l) decrypting, by the processor, the re-encrypted health data using the symmetric key;
m) generating, by the processor, decrypted health data from the decrypting of the re-encrypted health data;
n) analyzing, by the processor, the decrypted health data;
o) Developing, by the processor, a classification algorithm for disease diagnosis based on the analyzing of the decrypted health data; and
p) diagnosing a disease of a subject using the classification algorithm.

11. The method according to claim 10, the NFT being created using a blockchain.

12. The method according to claim 11, the blockchain being an Ethereum blockchain.

13. The method according to claim 11, the NFT being created further using smart contracts.

14. The method according to claim 10, the NFT being created using smart contracts.

15. The method according to claim 10, further comprising:
q) after decrypting the re-encrypted health data, encrypting, by the processor, the decrypted health data with the symmetric key;
r) generating, by the processor, post-use encrypted health data from the encrypting of the decrypted health data; and
s) sending, by the processor, the post-use encrypted health data to the IPFS with the symmetric key and storing the post-use encrypted health data and the symmetric key on the IPFS.

16. The method according to claim 10, the re-encrypting of the patient-generated health data being performed using a re-encryption oracle, and
the method further comprising:
t) before re-encrypting the patient-generated health data, sending, by the processor, the encrypted health data and the symmetric key from the IPFS to the re-encryption oracle.

17. The method according to claim 16, the generating of the encrypt data with the shared key being performed using a multi-party authentication server,
the generating of the re-encryption key being performed using the multi-party authentication server, and the method further comprising:
u) before generating the re-encryption key, sending, by the processor, the shared key to the multi-party authentication server; and
v) before re-encrypting the patient-generated health data, sending, by the processor, the re-encryption key to the re-encryption oracle from the multi-party authentication server.

18. The method according to claim 10, the generating of the encrypt data with the shared key being performed using a multi-party authentication server,
the generating of the re-encryption key being performed using the multi-party authentication server, and the method further comprising:
u) before generating the re-encryption key, sending, by the processor, the shared key to the multi-party authentication server.

19. A system for providing a decentralized marketplace for patient-generated health data, the system comprising:
a processor; and
a machine-readable medium in operable communication with the processor and having instructions stored thereon that, when executed by the processor, perform the following steps:
a) encrypting the patient-generated health data using a symmetric key;
b) generating encrypted health data from the encrypting of the patient-generated health data;
c) sending the encrypted health data to an interplanetary file system (IPFS) with the symmetric key and storing the encrypted health data and the symmetric key on the IPFS;
d) generating encrypt data with a shared key using a multi-party authentication server and providing it to an owner of the patient-generated health data;
e) creating a non-fungible token (NFT) and listing the NFT for sale on a data marketplace;
f) facilitating a purchase of the NFT by a purchaser from the data marketplace;
g) notifying the owner of the purchase;
h) sending the shared key to the multi-party authentication server
i) generating a re-encryption key from the shared key using the multi-party authentication server;
j) sending the encrypted health data and the symmetric key from the IPFS to a re-encryption oracle;
k) sending the re-encryption key to the re-encryption oracle from the multi-party authentication server
l) re-encrypting the patient-generated health data using the re-encryption oracle and the re-encryption key;
m) generating re-encrypted health data from the re-encrypting of the patient-generated health data;
n) providing the symmetric key and the re-encrypted health data to the purchaser;
o) Decrypting the re-encrypted health data using the symmetric key;
p) generating decrypted health data from the decrypting of the re-encrypted health data;
q) analyzing the decrypted health data;
r) developing a classification algorithm for disease diagnosis based on the analyzing of the decrypted health data;
s) diagnosing a disease of a subject using the classification algorithm
t) encrypting the decrypted health data with the symmetric key;
u) generating post-use encrypted health data from the encrypting of the decrypted health data; and
v) sending the post-use encrypted health data to the IPFS with the symmetric key and storing the post-use encrypted health data and the symmetric key on the IPFS,
the NFT being created using a blockchain.

20. The system according to claim 19, the blockchain being an Ethereum blockchain, and the NFT being created further using smart contracts.

* * * * *